United States Patent [19]

Kim

[11] Patent Number: 4,912,577
[45] Date of Patent: Mar. 27, 1990

[54] TRACKING APPARATUS FOR VCR

[75] Inventor: Jong H. Kim, Taegu, Rep. of Korea

[73] Assignee: Gold Star Co. Ltd., Seoul, Rep. of Korea

[21] Appl. No.: 943,907

[22] Filed: Dec. 19, 1986

[30] Foreign Application Priority Data

Dec. 21, 1985 [KR] Rep. of Korea ............... 17288/1985

[51] Int. Cl.⁴ ............................................... G11B 5/58
[52] U.S. Cl. .................... 360/77.13; 360/33.1; 360/10.2
[58] Field of Search ..................... 360/10.2, 70, 75, 77, 360/33.1, 64, 77.01, 77.12, 77.13, 77.16, 78.02

[56] References Cited

U.S. PATENT DOCUMENTS

| | | | |
|---|---|---|---|
| 4,470,079 | 9/1984 | Tsuruta ..................... | 360/77.13 X |
| 4,539,604 | 9/1985 | Namiki ...................... | 360/10.2 |
| 4,558,382 | 12/1985 | Edakubo et al. ............ | 360/10.2 |
| 4,777,543 | 10/1988 | Nishijima et al. ........... | 360/77.13 X |

Primary Examiner—Aristotelis M. Psitos
Attorney, Agent, or Firm—Birch, Stewart, Kolasch & Birch

[57] ABSTRACT

A tracking apparatus for a VCR comprises an operational amplifier comparator for comparing a reference voltage with an integrated drum rotation pulse signal. First and second switches are provided to respectively increase and decrease the value of the reference voltage applied to the operational amplifier comparator to respectively decrease and increase the width of a pulse signal produced by the comparator and input to a monostable multivibrator which controls the positioning of a video head relative to an advancing track of a scanned video tape. In this way, tracking adjustment can be performed by remote control and does not depend on the use of variable resistors usually present for the purpose of volume control.

5 Claims, 3 Drawing Sheets

4,912,577

TRACKING APPARATUS FOR VCR

BACKGROUND OF THE INVENTION

1. Field of the Invention

This invention relates to a video tape recorder of the cassette typ (VCR) for recording and reproducing video signals on a video tape, and more particularly to a tracking apparatus for a VCR wherein a video head can be controlled to accurately trace a track having video signals recorded therein while the video head scans the track thereof, thereby obtaining a clean, reproduced video signal image.

2. Description of the Prior Art

The conventional tracking apparatus is fairly complicated because a user must perform the tracking adjustment by changing the resistance of a variable resistor.

Specifically, the prior art tracking apparatus is configured by means of connecting a power supply terminal Vcc through a pair of variable resistors $VR_1$ and $VR_2$ to both a capacitor $C_1$ and a tracking monostable multivibrator, as shown in FIG. 1.

In the prior art tracking apparatus as configured above, as a user was adjusting a variable resistor $VR_1$, the time constant of capacitor $C_1$ was changed; thus the output time of a pulse signal from the tracking monostable multivibrator was changed. The above tracking apparatus has many drawbacks in that a user must vary a variable resistor $VR_1$ every time tracking adjustment was to be performed; the tracking adjustment was inaccurate due to an inherent nonlinear characteristic of the variable resistor $VR_1$ in performing the tracking adjustment; and fault frequency of the VCR set dependent on the life time of the variable resistor $VR_1$ was considerably high. Also, it was impossible to control the tracking adjustment remotely in a remote controlling VCR.

OBJECT OF THE INVENTION

Accordingly, it is an object of the present invention to provide a tracking apparatus for a VCR which can perform accurate tracking adjustment by a simple operation of switches.

It is another object of the present invention to provide a tracking apparatus of VCR which can perform the tracking adjustment automatically and also can be remotely controlled for a remote control VCR.

SUMMARY OF THE INVENTION

In the VCR tracking apparatus according to the present invention, a head switching terminal is commonly connected through a differentiation and a diode to each terminal of a plurality of switches; a fixed terminal of the first switch is commonly connected through a differentiator and a diode to a playing terminal and an inverting input terminal of an operational amplifier, a capacitor and the collector of a transistor, while a fixed terminal of the second switch is connected to the bsase of the transistor; a drum pulse terminal is connected through a integrator to an non-inverting input terminal of the operational amplifier and the output terminal of the operational amplifier is commonly connected through a resistor to an other capacitor and a tracking monostable multivibrator.

BRIEF DESCRIPTION OF THE INVENTION

These objects and features of the present invention will become apparent from the following description of embodiments with reference to the accompanying drawings in which:

FIG. 1 is a circuit diagram of the prior art tracking apparatus,

FIG. 2 is a detailed circuit diagram showing one embodiment of the tracking apparatus in accordance with the present invention, FIG. 3, consisting of (A)–(G), shows signal waveforms of each portion of FIG. 2, FIG. 4 is a detail circuit diagram showing another embodiment of the tracking apparatus in accordance with the present invention, and FIG. 5 is a detailed circuit diagram showing still another example of the apparatus which can remotely control the switches for tracking adjustment of FIG. 2.

DETAILED DESCRIPTION OF THE INVENTION

Figure 1:
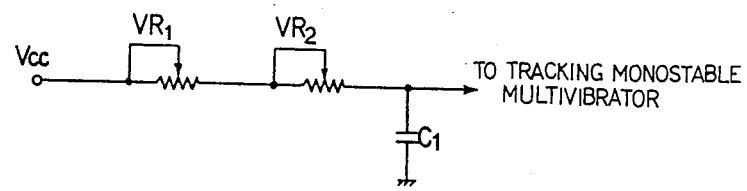
Figure 2:
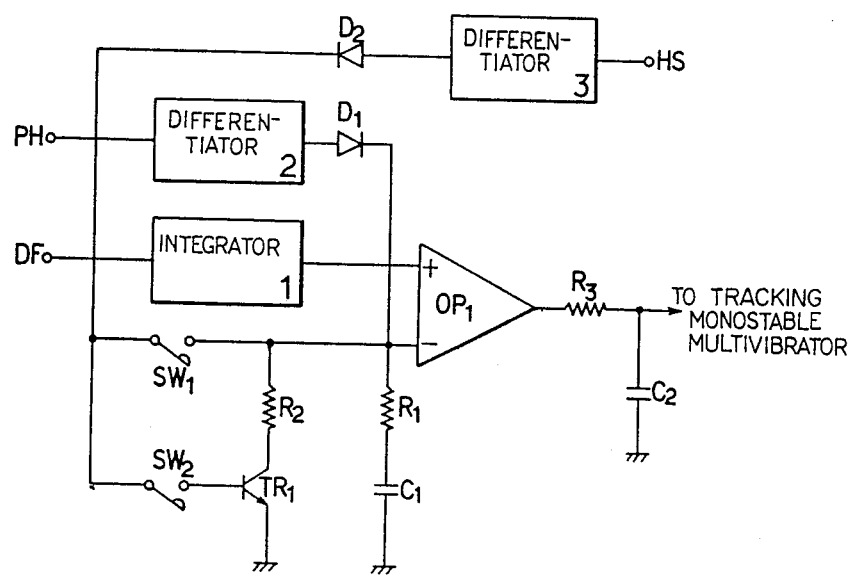

Referring to FIG. 2, there is shown a detailed circuit diagram representing one embodiment of the tracking apparatus according to the present invention. As shown in FIG. 2, a drum pulse terminal DF is connected through an integrator 1 to a non-inverting input terminal + of operational amplifier $OP_1$, and a playback terminal PH is connected through a differentiator 2 and a diode $D_1$ to an inverting input terminal − of operational amplifier $OP_1$. Then, the connection node between said diode $D_1$ and said inverting input terminal is connected of a serial connection to a resistor $R_1$ and a capacitor $C_1$. Also, a head switching terminal HS is connected through a differentiator 3 and a diode $D_2$ to the movable terminals of switches $SW_1$ and $SW_2$, the fixed terminal of switch $SW_1$ being connected to the cathode of said diode $D_1$, and the common node of the inverting input terminal − of operational amplifier $OP_1$ and the resistor $R_1$, which then is connected through a resistor $R_2$ to the collector of a transistor $TR_1$ having its base connected to the fixed terminal of switch $SW_2$. Further, the output terminal of operational amplifier $OP_1$ is connected through a resistor $R_3$ to both a capacitor $C_2$ and a tracking monostable multivibrator. Herein, a pulse signal generated by the rotation of a drum is input to the drum pulse terminal DF, and a high voltage signal is input to the reproducing playback terminal PH during the playing mode of the VCR. Also, a head switching pulse at 30 Hz is input to head switching terminal HS.

One embodiment of the present tracking apparatus as configured will be explained in detail, in terms of the operation and effect thereof.

In the playing mode started by pressing a playing button of the VCR, high voltage signal is input to a reproducing terminal PH and differentiated by the differentiator 2, and thereafter charges in the capacitor $C_1$ through the diode $D_1$ and the resistor $R_1$. At this time, since the transistor $TR_1$ remains in the off state by the opening of switch $SW_2$ and the input impedance of operational amplifier $OP_1$ is extremely high, the charge voltage of capacitor $C_1$ applies a constant reference voltage $Vref_1$ through the resistor $R_1$ to the inverting input terminal − of operational amplifier $OP_1$ while not being discharged.

Figure 3:
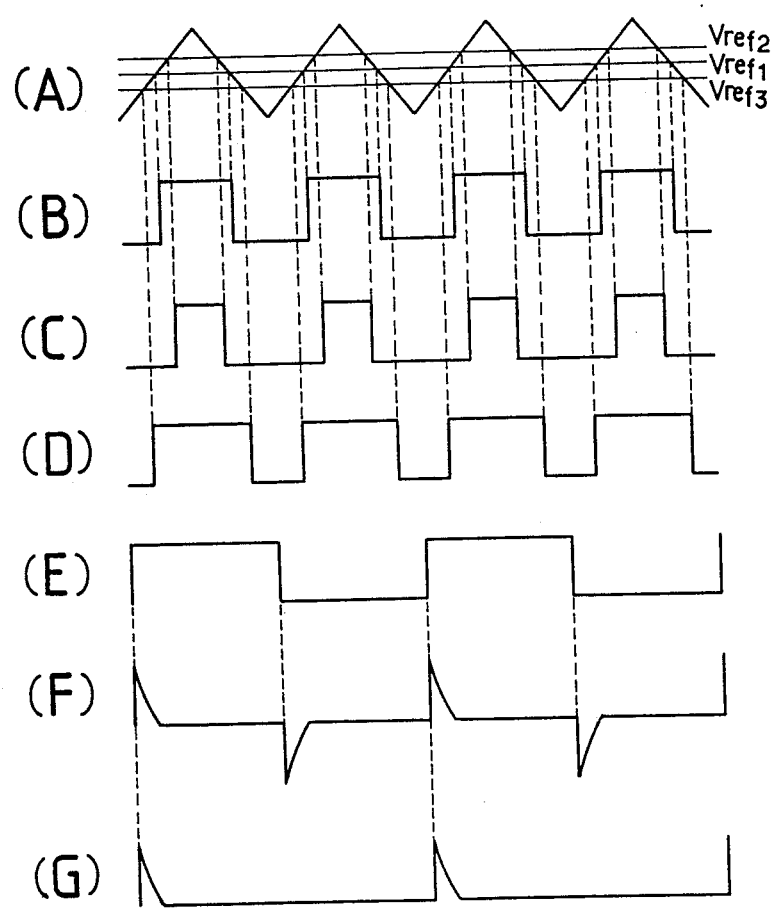

A drum pulse signal generated by the rotation of a drum is input to the drum pulse terminal DF, and the input drum pulse signal is represented by the integrator 1 as shown in FIG. 3(A). Accordingly, the operational amplifier $OP_1$ compares the output voltage of integrator 1 applied to the non-inverting terminal + thereof with the reference voltage $V_{ref1}$ applied to the inverting terminal thereof, and outputs a pulse signal having a constant width as shown in FIG. 3(B). The output pulse signal is charged output through the resistor $R_3$ to charge the capacitor $C_2$ and is simultaneously applied to the tracking monostable multivibrator.

As the result of this, the tracking monostable multivibrator outputs a pulse signal at a constant time interval by the charged voltage of capacitor $C_2$, and controls the tracing of the video head along a track of the video tape.

If the switch $SW_1$ is closed for retarding a phase of the video head somewhat when the trace position of the video head is unsuitable, then a 30 Hertz head switching signal as shown in FIG. 3(E) is input to the head switching signal terminal HS, and differentiated by the differentiator 3 as shown in FIG. 3(F). Then, the differentiated signal is obtained as shown in FIG. 3(G) through diode $D_2$ to increase the charged voltage of capacitor $C_1$ as said switch $SW_1$ is closed. Accordingly, the reference voltage applied to an inverting input terminal − of operational amplifier $OP_1$ is leveled up to the reference voltage $V_{ref2}$ to narrow the width of the pulse signal obtained at the output terminal of operational amplifier $OP_1$ as shown in FIG. 3(C). As a result, the charged time of capacitor $C_2$ is lengthened to decrease the voltage applied to the tracking monostable multivibrator and to delay a pulse signal obtained at the tracking monostable multivibrator, thereby allowing the video head to trace the track of video tape by moving the position thereof backward.

If the switch $SW_2$ is closed when the trace position of the video head is moved backward excessively in the above described case, then the differentiated signal output from the differentiator 3 and through the diode $D_2$ as described above is applied to the base of transistor $TR_1$ according to the closing of said switch $SW_2$ for turning the transistor $TR_1$ on, thereby discharging the charged voltage of capacitor $C_1$ through the resistors $R_1$, $R_2$ and the transistor $TR_1$. Accordingly, the reference voltage applied to the inverting input terminal − of operational amplifier $OP_1$ is reduced to the reference $V_{ref3}$ to lengthen the width of the pulse signal obtained at the output terminal of operational amplifier $OP_1$ as shown in FIG. 3(D). As a result, the charged time of capacitor $C_2$ is shortened to increase the voltage applied to the tracking monostable multivibrator, thereby allowing the video head to trace the track of the video tape in an advanced position.

Moreover, if the switches $SW_1$ and $SW_2$ are closed or open by remote control, the charged voltage of capacitor $C_1$ may be remotely controlled, thereby conveniently performing tracking adjustment by remote control.

Figure 5:
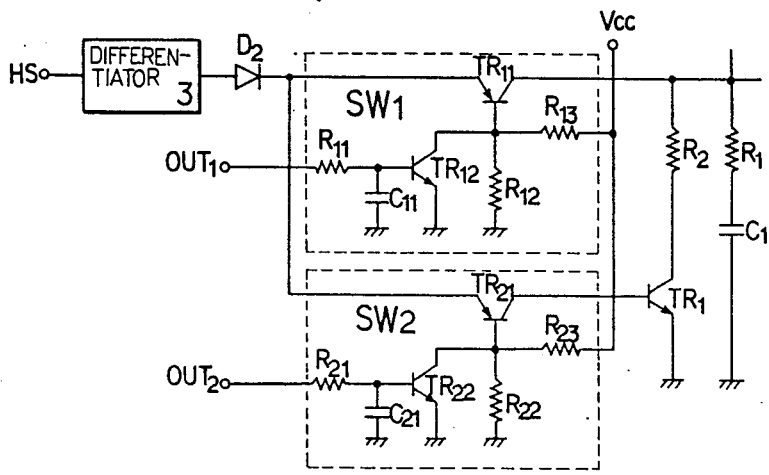

For example, as shown in FIG. 5, the switch $SW_1$ of FIG. 2 consists of resistors $R_{11}$ to $R_{13}$, a capacitor $C_{11}$ and transistors $TR_{11}$, $TR_{12}$, and the switch $SW_2$ consists of resistors $R_{21}$ to $R_{23}$, a capacitor $C_{21}$ and transistors $TR_{21}$, $TR_{22}$. In the configuration as described above, if the remote control signal for tracking adjustment which advances or retards the phase of the video head is received at the conventional remote control receiver a high voltage signal is applied to the output terinal to turn on the transistors $TR_{12}$ and $TR_{11}$ to increase the charged voltage of capacitor $C_1$, while the transistors $TR_{22}$ and $TR_{21}$ are turned on to reduce the charged voltage of capacitor $C_1$ when a high voltage signal is applied to the output terminal $OUT_2$, thereby performing tracking adjustment by remote control.

Figure 4:
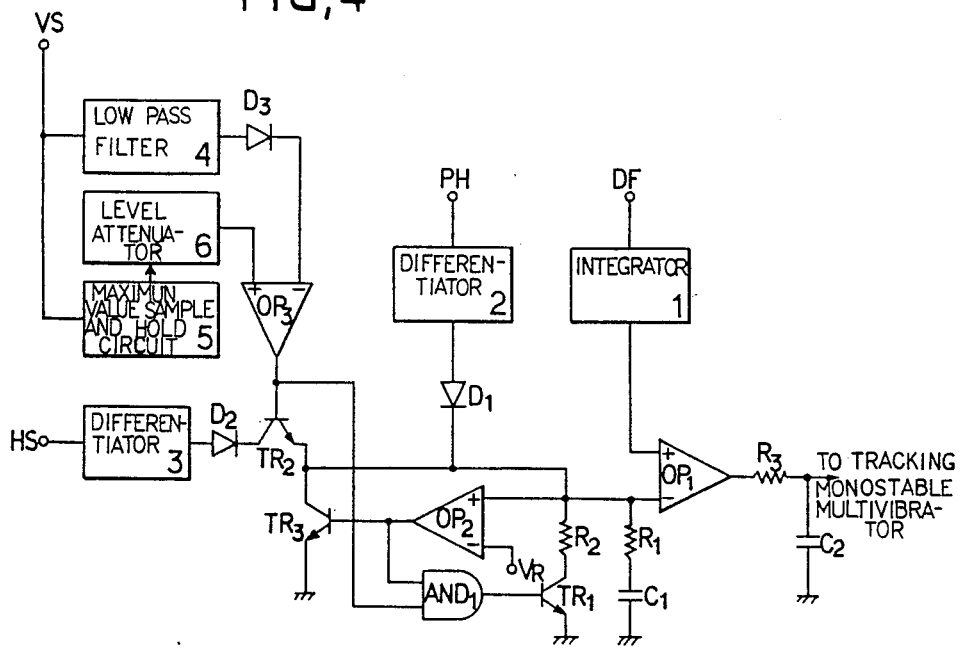

Referring now to FIG. 4, there is shown a detailed circuit diagram representing another embodiment of the tracking apparatus according to the present invention, which allows an automatic performance of the tracking adjustment. In FIG. 4, the output terminal of differentiator 2 connected to the playback terminal PH is commonly connected through a diode $D_1$ to the emitter of transistor $TR_2$, the collector of transistor $TR_3$, an inverting input terminal − of operational amplifier $OP_1$, the serial connection of resistor $R_1$ and capacitor $C_1$ and a non-inverting input terminal + of the operational amplifier $OP_2$ which has a reference voltage $V_R$ connected to its inverting input terminal −. Also, the common connection node is connected through the resistor $R_2$ to the collector of transistor $TR_1$, and the output terminal of operational amplifier $OP_2$ is commonly connected to both the base of said transistor $TR_3$ and one input terminal of AND gate $AND_1$. The output terminal of the differentiator 3 connected to the head switching terminal HS is connected through the diode $D_2$ to the collector of the transistor $TR_2$. Then, the reproducing signal terminal VS is connected through a lowpass filter 4 and a diode $D_3$ to an inverting input terminal of operational amplifier $OP_3$, and through a maximum value sample and hold circuit 5 and a voltage level attenuator 6 to a non-inverting input terminal + of operational amplifier $OP_3$, respectively. The output terminal of operational amplifier $OP_3$ is commonly connected to the base of transistor $TR_2$ and the other input terminal of AND gate $AND_1$, and the output terminal of AND gate $AND_1$ is connected to the base of transistor $TR_1$. In the configuration as described above, a video signal reproduced by the video head is input to the reproducing signal terminal VS.

This embodiment of the present tracking apparatus is operated in the playing mode by pressing a playing button of the VCR, a high voltage is applied to the playback terminal PH, differentiated by the differentiator 2 and then charges the capacitor $C_1$ through the diode $D_1$ and resistor $R_1$, so that a constant reference voltage is applied to an inverting input terminal − of operational amplifier $OP_1$. Also, a drum pulse signal is input to the drum pulse terminal DF, integrated by the integrator 1, and thereafter applied to a non-inverting input terminal + of operational amplifier $OP_1$, so that a constant width of pulse signal is obtained at the output terminal of operational amplifier $OP_1$ and charged in the capacitor $C_2$ through the resistor $R_3$. The tracking monostable multivibrator outputs a pulse signal at a constant time interval to control the trace speed of the video head. A head switching signal of 30 Hz is input to the head switching terminal HS and then input through the diode $D_2$ to the collector of transistor $TR_2$.

If a video signal reproduced from a video tape by the video head is input to the playing signal terminal VS, the input reproduced video signal is applied to an inverting input terminal − of operational amplifier $OP_3$ through the lowpass filter 4 and the diode $D_3$ and simultaneously input to the maximum value sample and hold circuit 5 for sampling the maximum value of said signal. Thereafter, the resultant signal is attenuated by the voltage level attenuator 6 slightly and applied to a non-inverting input terminal of operational amplifier $OP_3$.

The reason why the level attenuator 6 attenuates the sampled maximum value and applies the non-inverting input terminal + of operational amplifier $OP_3$ is because the level of the maximum value can be obtained only when the video head traces a track accurately and also a slight deviation occurs even though the video head traces the track accurately.

At this time, if the voltage applied via the lowpass filter 4 and the diode $D_3$ to the inverting input terminal − of operational amplifier $OP_3$ by the performance of said accurate tracking, is higher than or equal to the voltage applied through the voltage level attenuator 6 to the non-inverting input terminal + of operational amplifier $OP_3$ after it is sampled at the maximum sample and hold circuit 5, then a low level voltage is obtained at the output of said operational amplifier $OP_3$ and then applied to the base of transistor $TR_2$ and other input terminal of AND gate $AND_1$ for turning the transistor $TR_2$ off and also a low level voltage is obtained at the output of AND gate $AND_1$ to turn the transistor $TR_1$ off.

Therefore, the charged voltage of capacitor $C_1$ continues to remain at the previous state and applies a constant reference voltage to an inverting terminal of operational amplifier $OP_1$, so that the constant width of pulse signal is available at the output of operational amplifier $OP_1$ to charge the capacitor $C_2$, thereby allowing the tracking monostable multivibrator to output a pulse signal every constant time interval.

Alternatively, if the voltage applied to an inverting input terminal − of operational amplifier $OP_3$ by the inaccuracy of trace position, is lower than a non-inverting input terminal thereof, then a high level signal is obtained at the output of operational amplifier $OP_3$ and then applied to both the transistor $TR_2$ and the other input terminal of AND gate $AND_1$ for turning the transistor $TR_3$ on, so that the differentiated signal at the differentiator 3 going through the diode $D_2$ charges in the capacitor $C_1$ through the transistor $TR_2$ and the resistor $R_1$. Accordingly, the charged voltage of capacitor $C_1$ is increased to raise the reference voltage applied to an inverting input terminal − of the operational amplifier $OF_1$, so that the width of the pulse signal output from the operational amplifier $OP_1$ is reduced to lower the charge voltage of capacitor $C_2$ and therefore the pulse signal output at the tracking monostable multivibrator becomes slow gradually to determine the time of tracing the track accurately.

Further, if the voltage input to the reference voltage terminal $V_R$ is established at a lower voltage than the voltage applied to the non-inverting input terminal + of $OP_2$ when the capacitor $C_1$ is charged, then a high level signal is obtained at the output of operational amplifier $OP_2$ and applied to the base of transistor $TR_3$ and one input terminal of AND gate $AND_1$ for turning on the transistor $TR_3$ and also obtaining a high voltage at the output terminal of AND gate $AND_1$ to turn on the transistor $TR_1$, so that the charged voltage is discharged through the resistor $R_1$, the resistor $R_2$ and the transistor $TR_1$ and also through transistor $TR_3$ instantaneously.

Therefore, a pulse signal having much greater width is available at the output of operational amplifier $OP_1$ and thus the pulse signal output of the tracking monostable multivibrator becomes very fast, and in turn a high voltage continues to be obtained in the output of the operational amplifier to turn the transistor $TR_2$ on, so that the differentiated signal at the differentiator 3 going through the diode $D_2$ is charged in the capacitor through the transistor $TR_2$ and the resistor $R_1$ to find the tracing position accurately.

As described above, the first embodiment and other embodiments of present invention can perform the accurate tracking in that the charged voltage of the capacitor is charged linearly by the operation of switches without using variable resistors for volume control, and also eliminates the necessity of a user adjusting the tracking by varying the variable resistor for volume control by hand, by virtue of the remote and automatic control of the tracking.

What is claimed is:

1. A tracking apparatus for a video cassette recorder, comprising:
    reference voltage means for developing a reference voltage of a predetermined value at an output thereof;
    integrator means for integrating a drum rotation pulse of said recorder and developing an integration signal at an output thereof;
    comparator means for comparing said integration signal with said reference voltage and outputting a pulse signal when said integration signal is at least as great as said reference voltage;
    first reference voltage switching means for increasing the predetermined value of said reference voltage developed by said reference voltage means;
    second reference voltage switching means for decreasing the predetermined value of said reference voltage developed by said reference voltage means;
    tracking means for controlling the position of a video reproducing head relative to a track of a video tape inserted in said recorder in response to said pulse signal, said first reference voltage switching means retards the position of said head when a first switch is closed, and said second reference voltage switching means advances the position of said head when a second switch is closed by decreasing the value of said reference voltage; and
    video signal level determining means for determining the level of an output video signal and outputting a switching signal to said first reference voltage means to increase the value of said reference voltage when said output level is less than a maximum value.

2. A tracking apparatus as defined in claim 1, wherein said first reference voltage switching means comprises said first switch connected between a source of voltage and said reference voltage means, and said second second reference voltage switching means comprises said second switch connected between said reference voltage means and ground.

3. A tracking apparatus as defined in claim 2, wherein said first and second switches comprise transistors which are turned on and off in response to a voltage signal applied to base terminals thereof.

4. A tracking apparatus as defined in claim 2, wherein said source of voltage comprises a differentiator having an input coupled to receive a head switching signal, and applying a differentiated head switching signal to said reference voltage means via said first reference voltage switching means.

5. A tracking apparatus as defined in claim 1, wherein said comparator means comprises an operational amplifier.

* * * * *